(12) United States Patent
Tanaka

(10) Patent No.: US 9,863,299 B2
(45) Date of Patent: Jan. 9, 2018

(54) ENGINE EXHAUST TREATMENT DEVICE

(71) Applicant: KUBOTA Corporation, Osaka-shi, Osaka (JP)

(72) Inventor: Tamon Tanaka, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 126 days.

(21) Appl. No.: 14/963,316

(22) Filed: Dec. 9, 2015

(65) Prior Publication Data

US 2016/0281564 A1 Sep. 29, 2016

(30) Foreign Application Priority Data

Mar. 27, 2015 (JP) ................................. 2015-067481

(51) Int. Cl.
*F01N 13/08* (2010.01)
*F01N 3/08* (2006.01)
(Continued)

(52) U.S. Cl.
CPC ........... *F01N 3/0814* (2013.01); *F01N 3/103* (2013.01); *F01N 3/2066* (2013.01);
(Continued)

(58) Field of Classification Search
CPC ........ F01N 3/103; F01N 3/106; F01N 3/2066; F01N 13/009; F01N 2240/20; F01N 2260/06; F01N 2260/14; F01N 2470/30; F01N 2610/02; F01N 2610/1453
(Continued)

(56) References Cited

U.S. PATENT DOCUMENTS 6,444,177 B1 * 9/2002 Muller ............... B01D 53/8631
422/172
9,631,532 B2 * 4/2017 Sandou ................... F01N 3/035
(Continued)

FOREIGN PATENT DOCUMENTS

DE 102009046280 A1 5/2011
DE 102012216676 A1 3/2014
(Continued)

OTHER PUBLICATIONS

Extended Search Report dated Aug. 24, 2016 in EP Application No. 15198029.9.
(Continued)

*Primary Examiner* — Jorge Leon, Jr.
(74) *Attorney, Agent, or Firm* — Panitch Schwarze Belisario & Nadel LLP

(57) ABSTRACT

There is provided an engine exhaust treatment device in which stick of a nozzle portion of a urea water injector can be suppressed. The engine exhaust treatment device includes: an SCR catalyst case housing an SCR catalyst; an SCR exhaust inlet pipe; and the urea water injector and the nozzle portion of the urea water injector is directed toward an inside of the SCR exhaust inlet pipe. An exhaust deflector is provided in the SCR exhaust inlet pipe and the exhaust deflector is mounted to an inner peripheral face of the SCR exhaust inlet pipe on an exhaust upstream side of the urea water injector so that exhaust flowing toward the nozzle portion of the urea water injector is deflected by the exhaust deflector and diverted from the nozzle portion.

10 Claims, 16 Drawing Sheets

(51) Int. Cl.
*F01N 3/20* (2006.01)
*F01N 3/28* (2006.01)
*F01N 13/00* (2010.01)
*F01N 3/10* (2006.01)

(52) U.S. Cl.
CPC ......... *F01N 3/2892* (2013.01); *F01N 13/009* (2014.06); *F01N 13/08* (2013.01); *F01N 3/106* (2013.01); *F01N 2240/20* (2013.01); *F01N 2260/14* (2013.01); *F01N 2610/02* (2013.01); *F01N 2610/1453* (2013.01); *Y02T 10/24* (2013.01)

(58) Field of Classification Search
USPC ............................ 60/295, 299, 301, 317, 324
See application file for complete search history.

(56) References Cited

U.S. PATENT DOCUMENTS

| | | |
|---|---|---|
| 2009/0313979 A1 | 12/2009 | Kowada |
| 2010/0005790 A1* | 1/2010 | Zhang ...................... F01N 3/36 60/301 |
| 2010/0083641 A1 | 4/2010 | Makartchouk et al. |
| 2010/0186381 A1* | 7/2010 | Charles ................... F01N 3/025 60/282 |
| 2011/0146252 A1* | 6/2011 | Silver ..................... F01N 3/035 60/301 |
| 2011/0214415 A1* | 9/2011 | Thomas .................. F01N 3/103 60/297 |
| 2012/0124983 A1* | 5/2012 | Hong .................. B01F 3/04049 60/324 |

FOREIGN PATENT DOCUMENTS

| | | |
|---|---|---|
| JP | 2014148960 A | 8/2014 |
| WO | 2012047159 A1 | 4/2012 |

OTHER PUBLICATIONS

Office Action dated Apr. 19, 2017 in EP Application No. 15198029.9.

\* cited by examiner

FIG. 4A
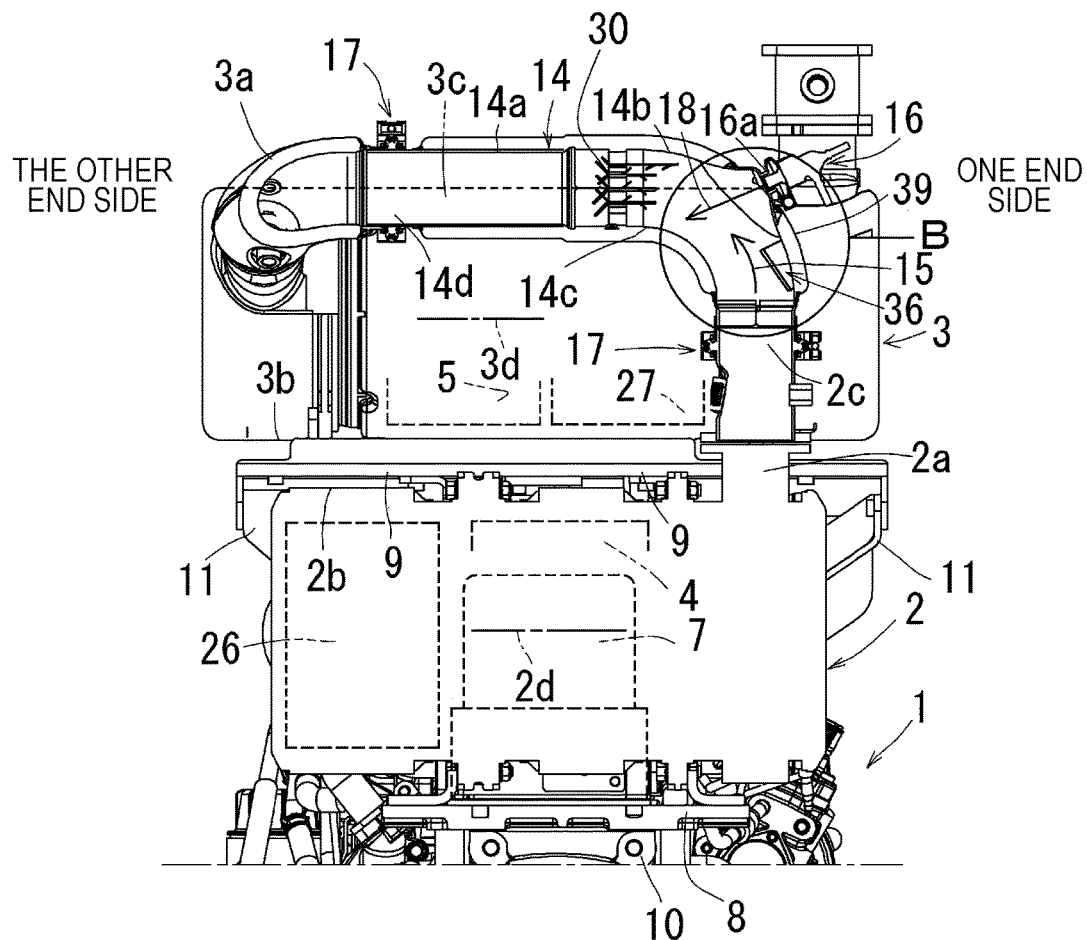
FIG. 4B
FIG. 4C
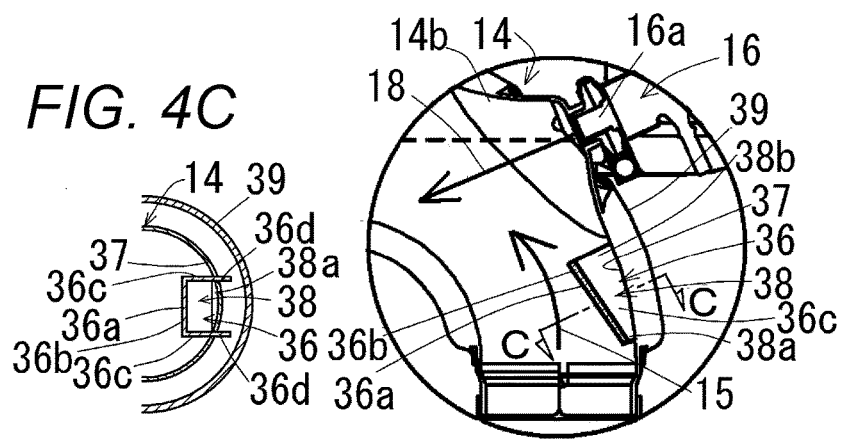

FIG. 13A
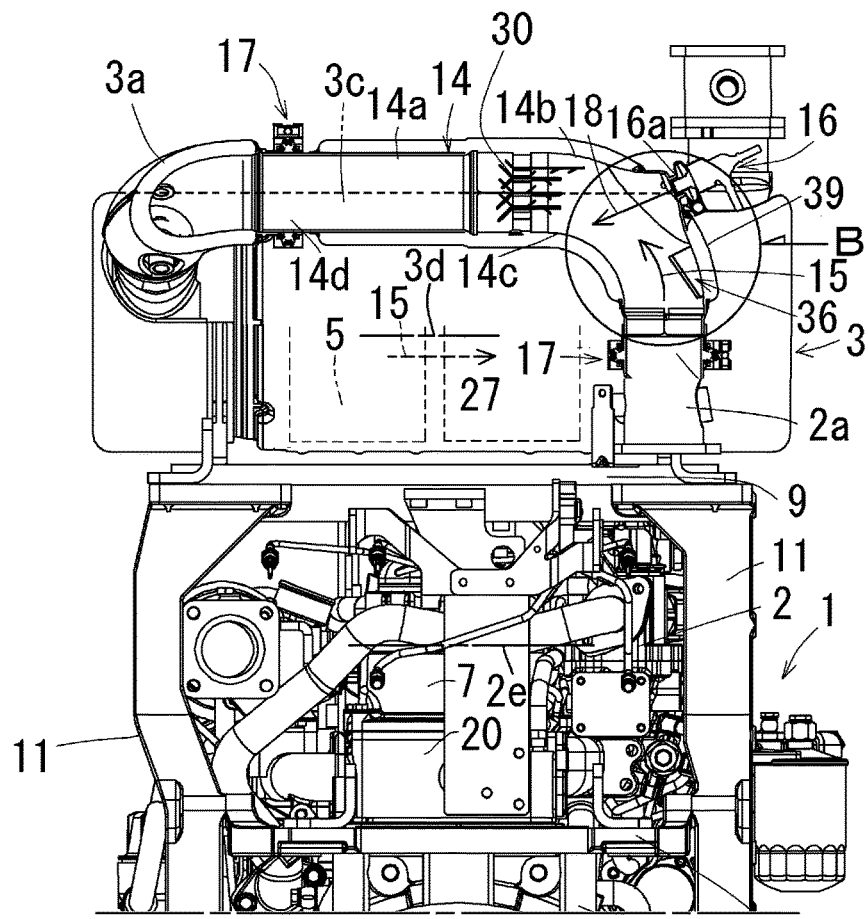
FIG. 13B
FIG. 13C
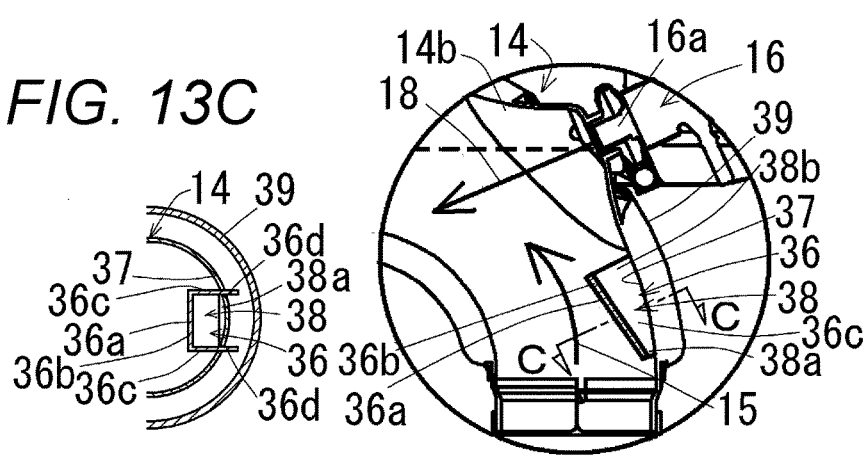

ENGINE EXHAUST TREATMENT DEVICE

BACKGROUND OF THE INVENTION (1) Field of the Invention

The present invention relates to an engine exhaust treatment device.

(2) Description of Related Art

Conventionally, in an engine exhaust treatment device, a nozzle portion of a urea water injector is exposed in an SCR exhaust inlet pipe and therefore takes a direct hit from the exhaust.

<<Problems>>

Sticking of the nozzle portion of the urea injector is likely to occur.

In the conventional engine exhaust treatment device, the nozzle portion is overheated by heat of the exhaust and urea resinifies to easily cause the sticking of the nozzle portion.

SUMMARY OF THE INVENTION

An object of the present invention is to provide an engine exhaust treatment device in which sticking of a nozzle portion of a urea water injector can be suppressed.

Matters specifying the present invention are as follows.

An engine exhaust treatment device includes: an SCR catalyst case housing an SCR catalyst; an SCR exhaust inlet pipe; and a urea water injector, with a nozzle portion of the urea water injector directed toward an inside of the SCR exhaust inlet pipe.

An exhaust deflector is provided in the SCR exhaust inlet pipe and the exhaust deflector is mounted to an inner peripheral face of the SCR exhaust inlet pipe on an exhaust upstream side of the urea water injector so that exhaust flowing toward the nozzle portion of the urea water injector is deflected by the exhaust deflector and diverted from the nozzle portion.

The present invention exerts the following effects.

<<Effects>> Sticking of the nozzle portion of the urea water injector can be suppressed.

The nozzle portion is less likely to take a direct hit from the exhaust and the sticking of the nozzle portion of the urea water injector due to overheating can be suppressed.

<<Effects>> Ease of Mixing of Urea Water and the Exhaust can be Improved.

The nozzle portion can be disposed in the SCR exhaust inlet pipe or disposed closer to the inside of the SCR exhaust inlet pipe, which improves penetration of the urea water in the SCR exhaust inlet pipe to improve ease of mixing of the urea water and the exhaust.

In other words, in order to prevent the exhaust from directly hitting the nozzle portion of the urea water injector without mounting the exhaust deflector to the inner peripheral face of the SCR exhaust inlet pipe, a urea water injection passage needs to be led radially outward from an SCR exhaust inlet pipe and a nozzle portion needs to be disposed at a led-out end. In this case, however, the nozzle portion is far from the SCR exhaust inlet pipe, which reduces penetration of urea water in the SCR exhaust inlet pipe to reduce ease of mixing of the urea water and exhaust. In the invention, on the other hand, the nozzle portion can be disposed in the SCR exhaust inlet pipe or disposed closer to the inside of the SCR exhaust inlet pipe, which prevents such problems.

BRIEF DESCRIPTION OF THE DRAWINGS

FIGS. 4A to 4C are drawings for explaining a main part of the engine in FIG. 1, wherein FIG. 4A is a back view of an upper portion of the engine in FIG. 1 with a part of piping shown in a vertical sectional view, FIG. 4B is an enlarged view of part B of FIG. 4A, and FIG. 4C is a sectional view taken along line C-C in FIG. 4B;

FIGS. 13A to 13C are drawings for explaining a main part of the engine in FIG. 10, wherein FIG. 13A is a back view of an upper portion of the engine in FIG. 10 with a part of piping shown in a vertical sectional view, FIG. 13B is an enlarged view of part B of FIG. 13A, and FIG. 13C is a sectional view taken along line C-C in FIG. 13B;

DETAILED DESCRIPTION OF PREFERRED EMBODIMENTS

Figure 1:
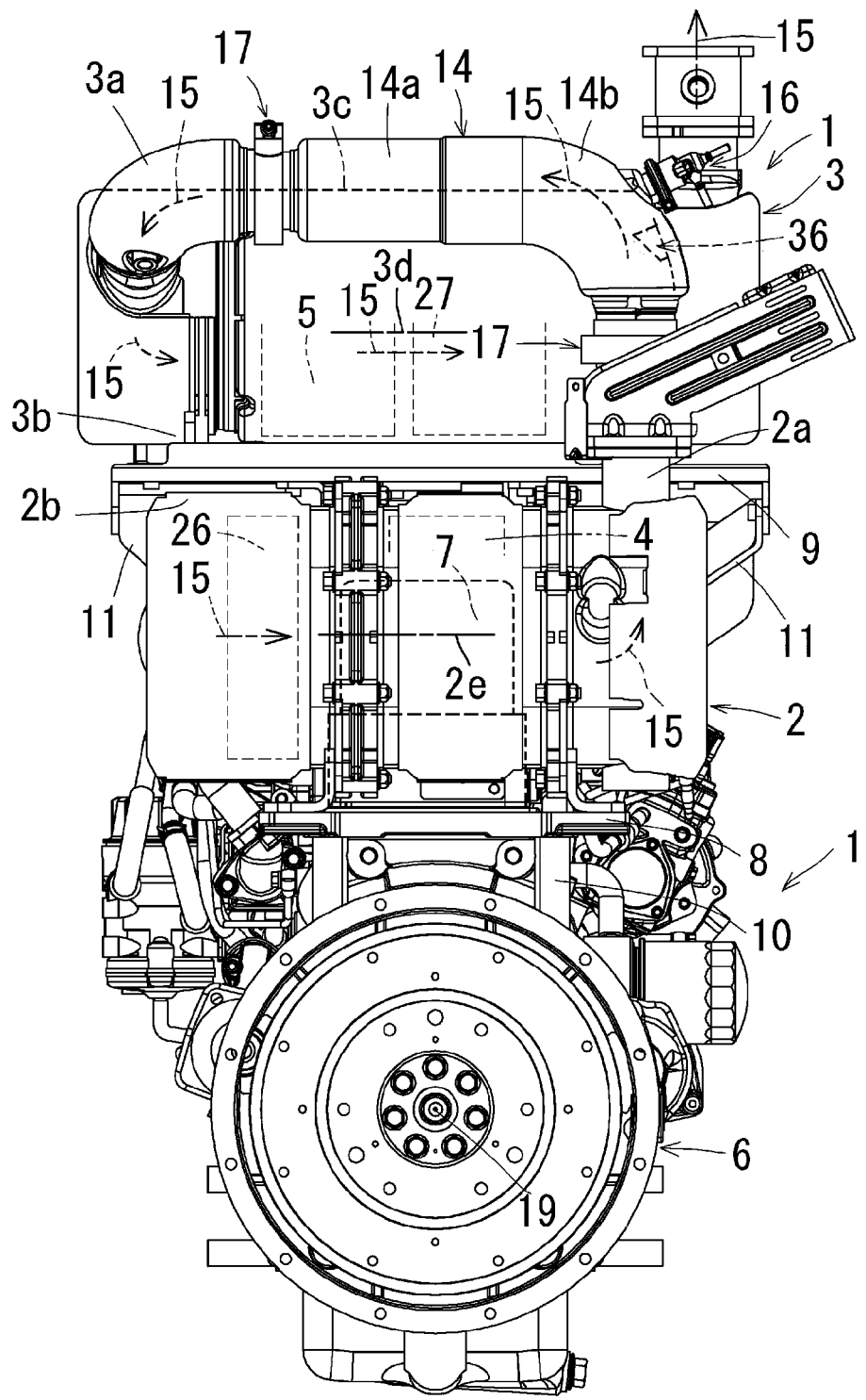
FIG. 1 is a back view of a diesel engine according to a first embodiment of the present invention.

FIGS. 1 to 9 are drawings for explaining a diesel engine according to a first embodiment of the present invention and FIGS. 10 to 16 are drawings for explaining a diesel engine according to a second embodiment of the invention. In each of the embodiments, a vertical straight multicylinder diesel engine will be described.

A general outline of the engine according to the first embodiment is as follows.

The engine is mounted with an exhaust treatment device.

As shown in FIG. 4A, the exhaust treatment device includes an SCR catalyst case (3) housing an SCR catalyst (5), an SCR exhaust inlet pipe (14), and a urea water injector (16) and the urea water injector (16) is directed toward an inside of the SCR exhaust inlet pipe (14).

The exhaust treatment device can carry out reduction of NOx in exhaust (15) by use of the SCR catalyst (5). NOx is an abbreviation of nitrogen oxides.

As shown in FIG. 4A, in the SCR catalyst case (3), the SCR catalyst (5) is housed on an exhaust upstream side and an ammonia purification oxidation catalyst (27) is housed on an exhaust downstream side to thereby prevent ammonia slip. SCR is an abbreviation of selective catalytic reduction.

As shown in FIG. 4B, an exhaust deflector (36) is provided in the SCR exhaust inlet pipe (14) and the exhaust deflector (36) is mounted to an inner peripheral face (37) of the SCR exhaust inlet pipe (14) on the exhaust upstream side of the urea water injector (16) so that the exhaust (15) flowing toward a nozzle portion (16a) of the urea water injector (16) is deflected by the exhaust deflector (36) and diverted from the nozzle portion (16a).

Therefore, the nozzle portion (16a) is less likely to take a direct hit from the exhaust (15) and sticking of the nozzle portion (16a) of the urea water injector (16) due to overheating can be suppressed.

Moreover, the nozzle portion (16a) can be disposed in the SCR exhaust inlet pipe (14) or disposed closer to the inside of the SCR exhaust inlet pipe (14), which improves penetration of urea water (18) in the SCR exhaust inlet pipe (14) to increase ease of mixing of the urea water (18) and the exhaust (15).

In other words, in order to prevent the exhaust from directly hitting the nozzle portion of the urea water injector without mounting the exhaust deflector to the inner peripheral face of the SCR exhaust inlet pipe, a urea water injection passage needs to be led radially outward from an SCR exhaust inlet pipe and a nozzle portion needs to be disposed at a led-out end. In this case, however, the nozzle portion is far from the SCR exhaust inlet pipe, which reduces penetration of urea water in the SCR exhaust inlet pipe to reduce ease of mixing of the urea water and exhaust. In the embodiment, on the other hand, the nozzle portion (16a) can be disposed in the SCR exhaust inlet pipe (14) or disposed closer to the inside of the SCR exhaust inlet pipe (14), which prevents such problems.

As shown as an example in FIG. 4B, the exhaust deflector (36) has an exhaust deflecting face (36a) and the exhaust deflecting face (36a) is formed to gradually separate from the inner peripheral face (37) of the SCR exhaust inlet pipe (14) as it extends from the exhaust upstream side toward the exhaust downstream side.

Therefore, the exhaust deflecting face (36a) gently deflects the exhaust (15) to thereby suppress increase in back pressure.

In other words, if the exhaust deflecting face is orthogonal to a direction of the exhaust, the exhaust inverts on the exhaust deflecting face toward the exhaust upstream side and the increase in the back pressure cannot be suppressed. In the invention, on the other hand, the exhaust deflecting face (36a) gently deflects the exhaust (15), which suppresses occurrence of inversion of the exhaust (15) and the above-described problem.

As shown in FIG. 4B, the exhaust deflector (36) has an exhaust deflecting plate (36b), the exhaust deflecting plate (36b) is separated from the inner peripheral face (37) of the SCR exhaust inlet pipe (14), and one of front and back faces of the exhaust deflecting plate (36b) and not facing the inner peripheral face (37) of the SCR exhaust inlet pipe (14) serves as the exhaust deflecting face (36a).

Between the exhaust deflecting plate (36b) and the inner peripheral face (37) of the SCR exhaust inlet pipe (14), an exhaust passing clearance (38) is provided.

Therefore, the exhaust (15) passes through the exhaust passing clearance (38) and it is possible to suppress a problem of accumulation of urea crystal between the exhaust deflecting plate (36b) and the inner peripheral face (37) of the SCR exhaust inlet pipe (14).

In other words, if exhaust does not pass between an exhaust guide plate and an inner peripheral face of an SCR exhaust inlet pipe, the exhaust stagnates to cause accumulation of urea crystal between the exhaust guide plate and the inner peripheral face. In the embodiment, on the other hand, the exhaust (15) passes through the exhaust passing clearance (38) and does not stagnate, which suppresses the above-described problem.

Moreover, the exhaust passing clearance (38) is formed so that an opening area of a start opening portion (38a) on the exhaust upstream side is smaller than an opening area of an end opening portion (38b) on the exhaust downstream side.

Therefore, it is possible to limit an amount of the exhaust (15) passing through the exhaust passing clearance (38) with the start opening portion (38a) to thereby suppress a problem of occurrence of sticking of the nozzle portion (16a) of the urea water injector (16) due to the exhaust (15) passing through the exhaust passing clearance (38).

In other words, if an excessive amount of exhaust passes through an exhaust passing clearance, surplus exhaust passing through the exhaust passing clearance collides with a nozzle portion of a urea water injector to thereby cause sticking of the nozzle portion due to overheating. In the embodiment, on the other hand, the opening area of the start opening portion (38a) of the exhaust passing clearance (38) is smaller and therefore, it is possible to limit the amount of the exhaust passing through the exhaust passing clearance (38) to thereby suppress the above-described problem.

As shown in FIGS. 4B and 4C, the exhaust deflector (36) has the exhaust deflecting plate (36b) and paired side plates (36c), (36c) and the side plates (36c), (36c) are bent from opposite side end edges of the exhaust deflecting plate (36b) toward the inner peripheral face (37) of the SCR exhaust inlet pipe (14). As shown in FIG. 4C, the exhaust deflector (36) is formed in an angular U shape from a view parallel to a passing direction of the exhaust (15). Bent end portions (36d), (36d) of the side plates (36c), (36c) pass through a pipe wall of the SCR exhaust inlet pipe (14) to be welded on an outer peripheral face of the SCR exhaust inlet pipe (14) so that the exhaust deflector (36) is supported on the SCR exhaust inlet pipe (14). An outer peripheral face of the SCR exhaust inlet pipe (14) and the bent end portions (36d), (36d) of the side plates (36c), (36c) are covered with a protective cover (39) and heat insulating material (not shown) is filled inside the protective cover (39).

Stainless steel plates are used for the SCR exhaust inlet pipe (14) and the exhaust deflector (36), an iron plate is used for the protective cover (39), and glass wool is used for the heat insulating material.

As shown in FIG. 1, the exhaust treatment device has a DOC case (2) housing a DOC (26) and the SCR catalyst case (3) is disposed in an orientation along a longitudinal direction of a central axis (2e) of the DOC case (2).

Figure 2:
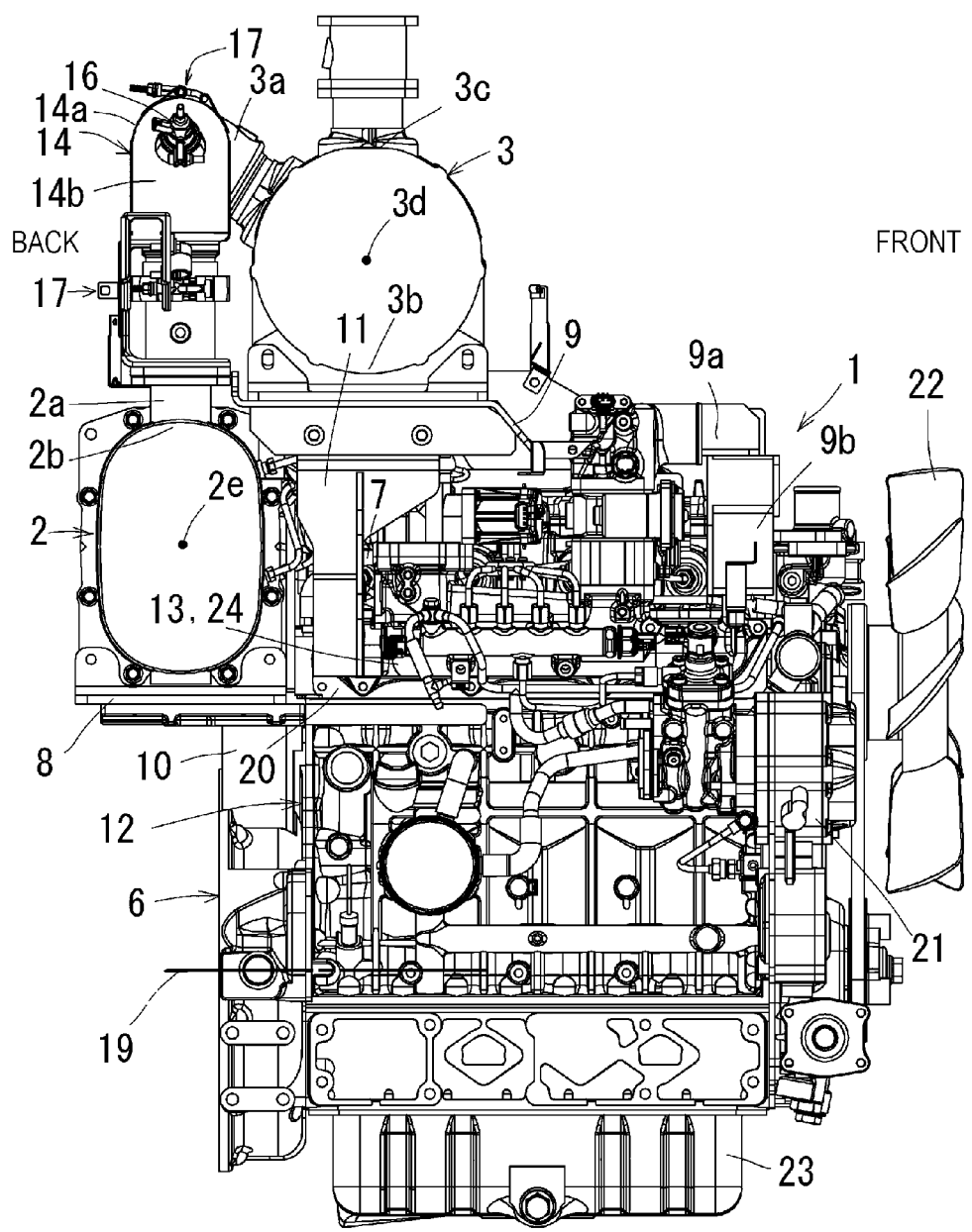
FIG. 2 is a right side view of the engine in FIG. 1.

As shown in FIG. 2, if a horizontal direction is a front-back direction with one side of the front-back direction being a front side and the other side being a back side from a view parallel to the longitudinal direction of the central axis (2e) of the DOC case (2), the SCR catalyst case (3) is disposed at a position displaced diagonally forward and upward from the DOC case (2).

As shown in FIG. 4A, the SCR exhaust inlet pipe (14) has a urea water mixing pipe portion (14a), the urea water mixing pipe portion (14a) is a pipe portion, where the exhaust (15) led out from the DOC case (2) and the urea water (18) injected from the nozzle portion (16a) of the urea water injector (16) are mixed, and is formed straight in an orientation along the central axis (2e) of the DOC case (2) and a central axis (3d) of the SCR catalyst case (3).

As shown in FIGS. 1 and 2, the urea water mixing pipe portion (14a) is disposed behind the SCR catalyst case (3) and above the DOC case (2).

Therefore, the DOC case (2), the SCR catalyst case (3), and the urea water mixing pipe portion (14a) do not cross each other and the DOC case (2), the SCR catalyst case (3), and the urea water mixing pipe portion (14a) can be disposed in a small space.

Figure 7:
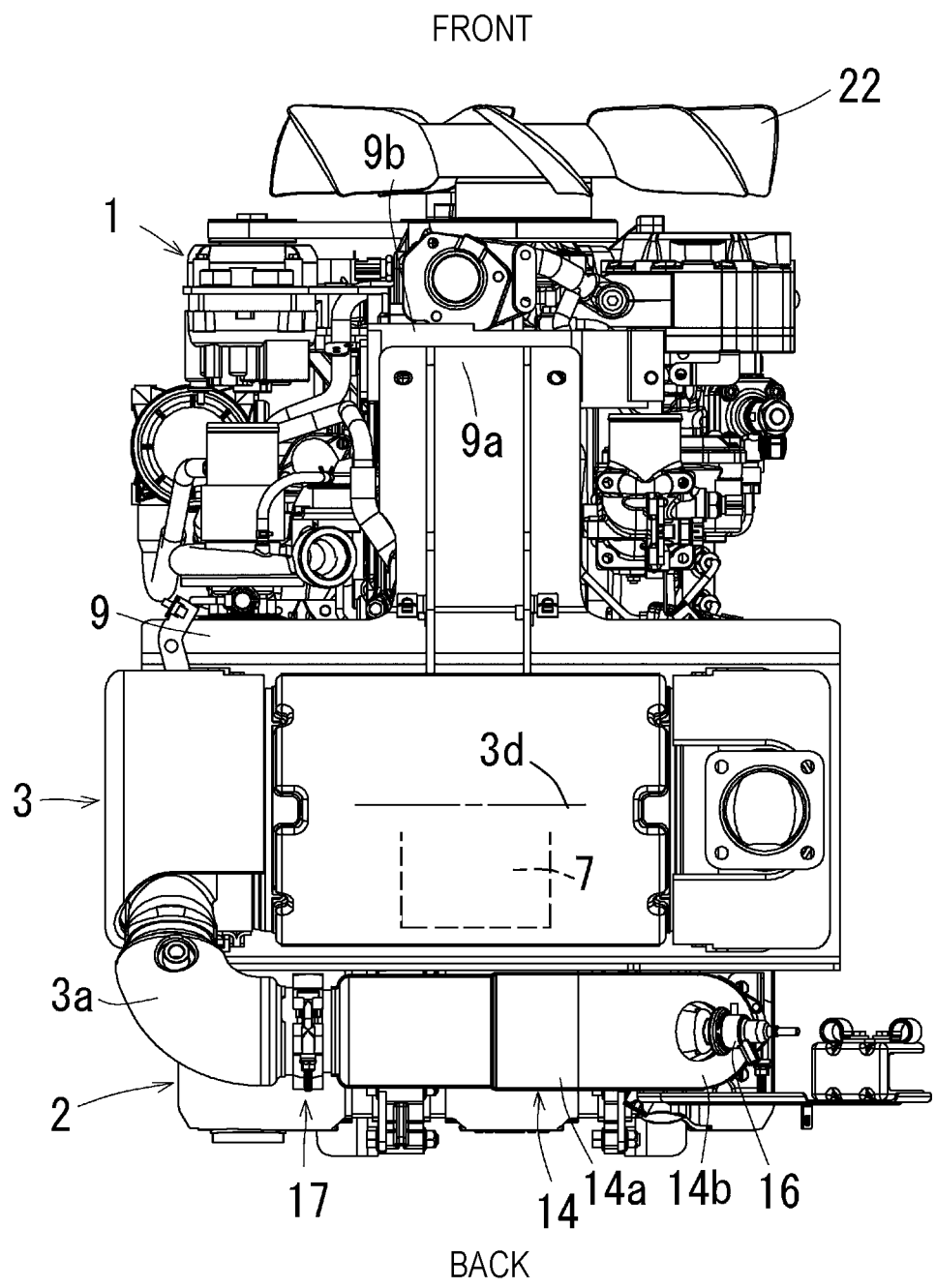
FIG. 7 is a plan view of the engine in FIG. 1.
Figure 8:
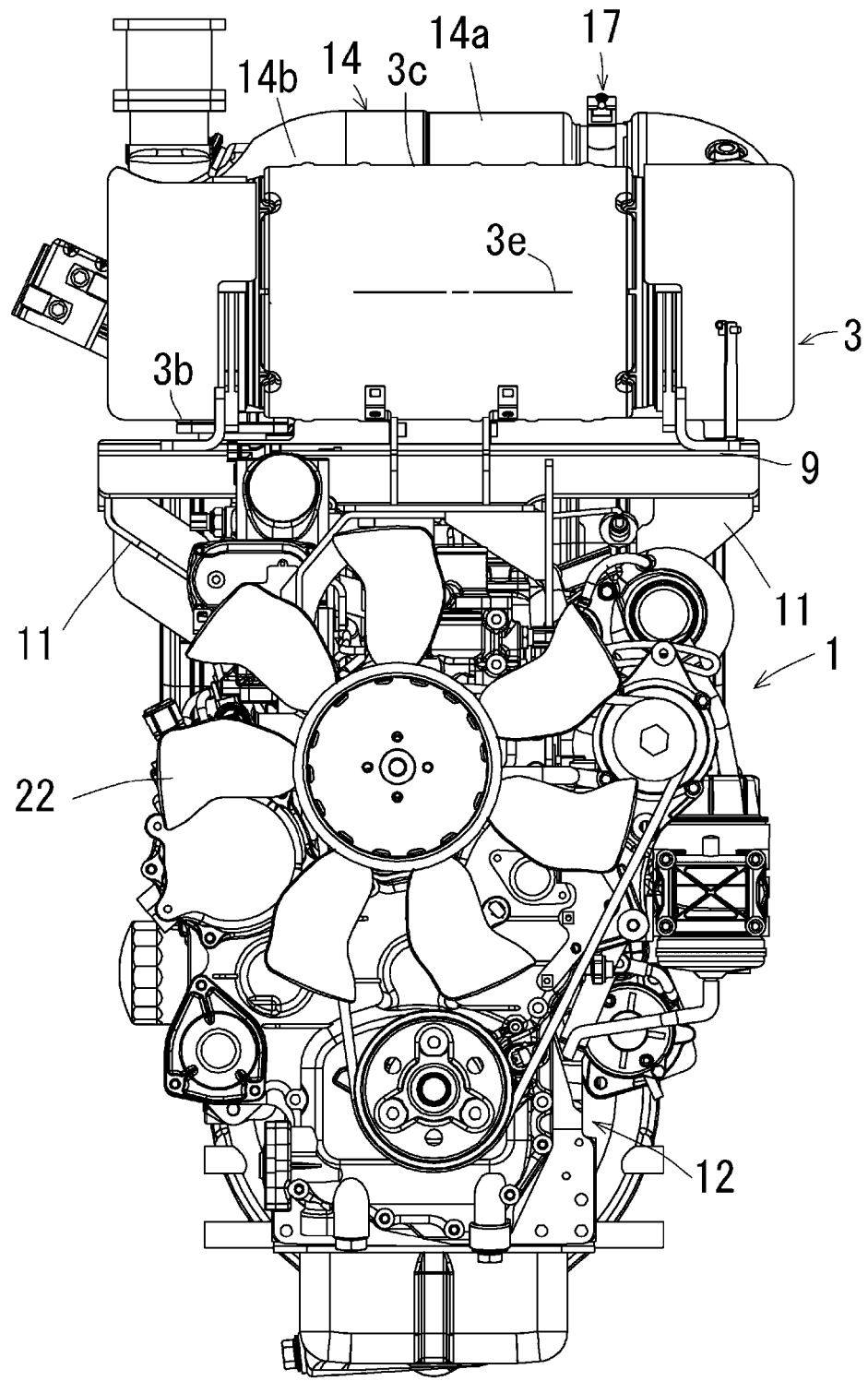
FIG. 8 is a front view of the engine in FIG. 1.

As shown in FIG. 7, the urea water mixing pipe portion (14a) is disposed directly above the DOC case (2). In other words, the urea water mixing pipe portion (14a) is disposed at a position overlapping an upper face of the DOC case (2) when seen in a direction parallel to a vertical direction in a plan view.

As shown in FIG. 1, the DOC (26) is housed on the exhaust upstream side and a DPF (4) is housed on the exhaust downstream side in the DOC case (2). DOC is an abbreviation of a diesel oxidation catalyst and DPF is an abbreviation of a diesel particulate filter. A different DOC from the DOC (26) on the exhaust upstream side may be used in place of the DPF (4) so that the plurality of DOCs are arranged and housed in series.

As shown in FIGS. 1 and 2, each of the DOC case (2) and the SCR catalyst case (3) has a cylindrical peripheral wall and opposite end walls closing opposite ends of the cylindrical peripheral wall and the central axis (2e) or (3d) is oriented in a longitudinal direction of the DOC case (2) or the SCR catalyst case (3). The cylindrical peripheral wall of the DOC case (2) is in an elongated circular cylindrical shape having a greater diameter in the vertical direction than a diameter in the front-back direction and the cylindrical peripheral wall of the SCR catalyst case (3) is in a circular cylindrical shape with a uniform diameter.

As shown in FIG. 1, a highest portion (2b) of a peripheral face of the DOC case (2) is disposed at a lower position than a lowest portion (3b) of a peripheral face of the SCR catalyst case (3). The urea water mixing pipe portion (14a) is disposed at a position overlapping a highest portion (3c) of the peripheral face of the SCR catalyst case (3) from a view parallel to the front-back direction.

Therefore, the urea water mixing pipe portion (14a) is disposed at a sufficient upward distance from the highest portion (2b) of the peripheral face of the DOC case (2), which suppresses a problem of overheating of the urea water mixing pipe portion (14a) by heat generation of the DOC (26). If the urea water mixing pipe portion (14a) is overheated, the accumulation of the urea crystal may be caused in the urea water mixing pipe portion (14a).

As shown in FIG. 4B, the urea water injector (16) is mounted to a middle portion of a curved pipe portion (14b) forming the SCR exhaust inlet pipe (14). As shown in FIG. 4A, the nozzle portion (16a) is slightly oriented toward the urea water mixing pipe portion (14a) rather than oriented in a radial direction of the curved pipe portion (14b).

As shown in FIG. 4A, a mixer plate (30) is provided in the urea water mixing pipe portion (14a) of the SCR exhaust inlet pipe (14) to facilitate mixing of the exhaust (15) and the urea water (18).

As shown in FIGS. 4A and 4B, the exhaust deflector (36) is mounted to a start portion on the exhaust upstream side of the curved pipe portion (14b) forming the SCR exhaust inlet pipe (14).

An outline of the engine mounted with the exhaust treatment device is as follows.

As shown in FIG. 2, a longitudinal direction of a crankshaft central axis (19) of an engine main body (1) is defined as a front-back direction with one side of the front-back direction being a front side and the other side being a back side. As shown in FIG. 1, from a view parallel to the front-back direction, a width direction of the engine main body (1) which is a horizontal direction is defined as a lateral direction.

As shown in FIG. 2, a cylinder head (20) is mounted to an upper portion of a cylinder block (12), a cylinder head cover (7) is mounted to an upper portion of the cylinder head (20), a water pump case (21) is mounted to a front portion of the cylinder block (12), an engine cooling fan (22) is disposed in front of the water pump case (21), a flywheel housing (6) is disposed behind the cylinder block (12), and an oil pan (23) is mounted to a lower portion of the cylinder block (12).

Figure 3:
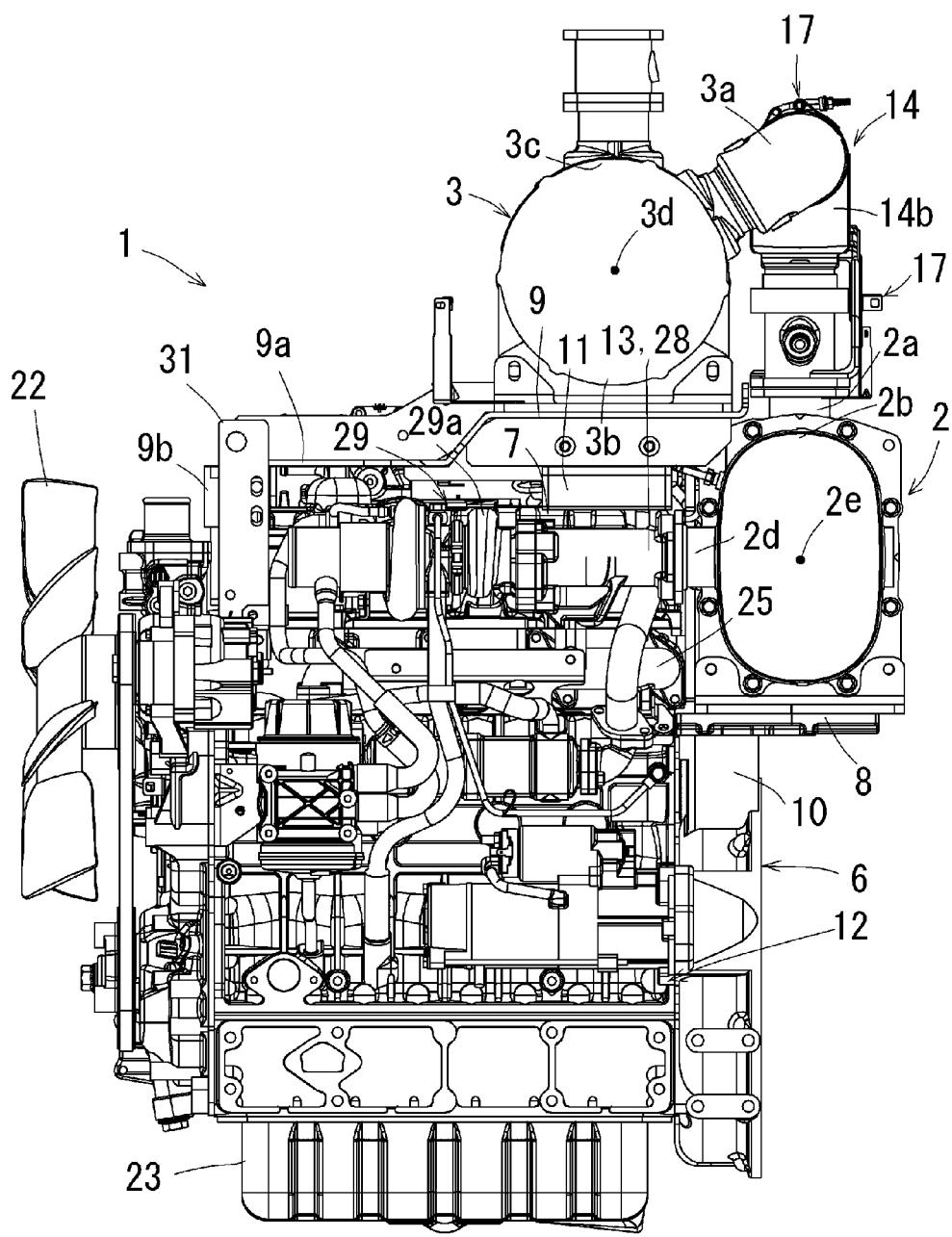
FIG. 3 is a left side view of the engine in FIG. 1.
Figure 5:
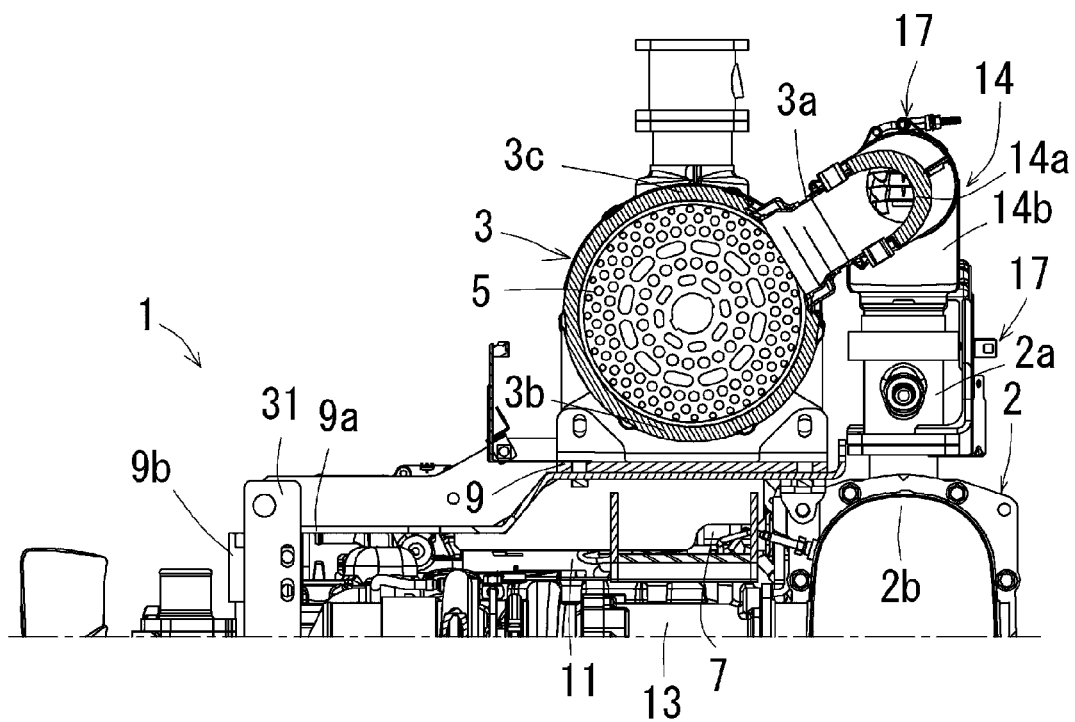
FIG. 5 is a left side view of the upper portion of the engine in FIG. 1 with parts of an SCR catalyst case and an exhaust inlet pipe shown in vertical sectional views.
Figure 6:
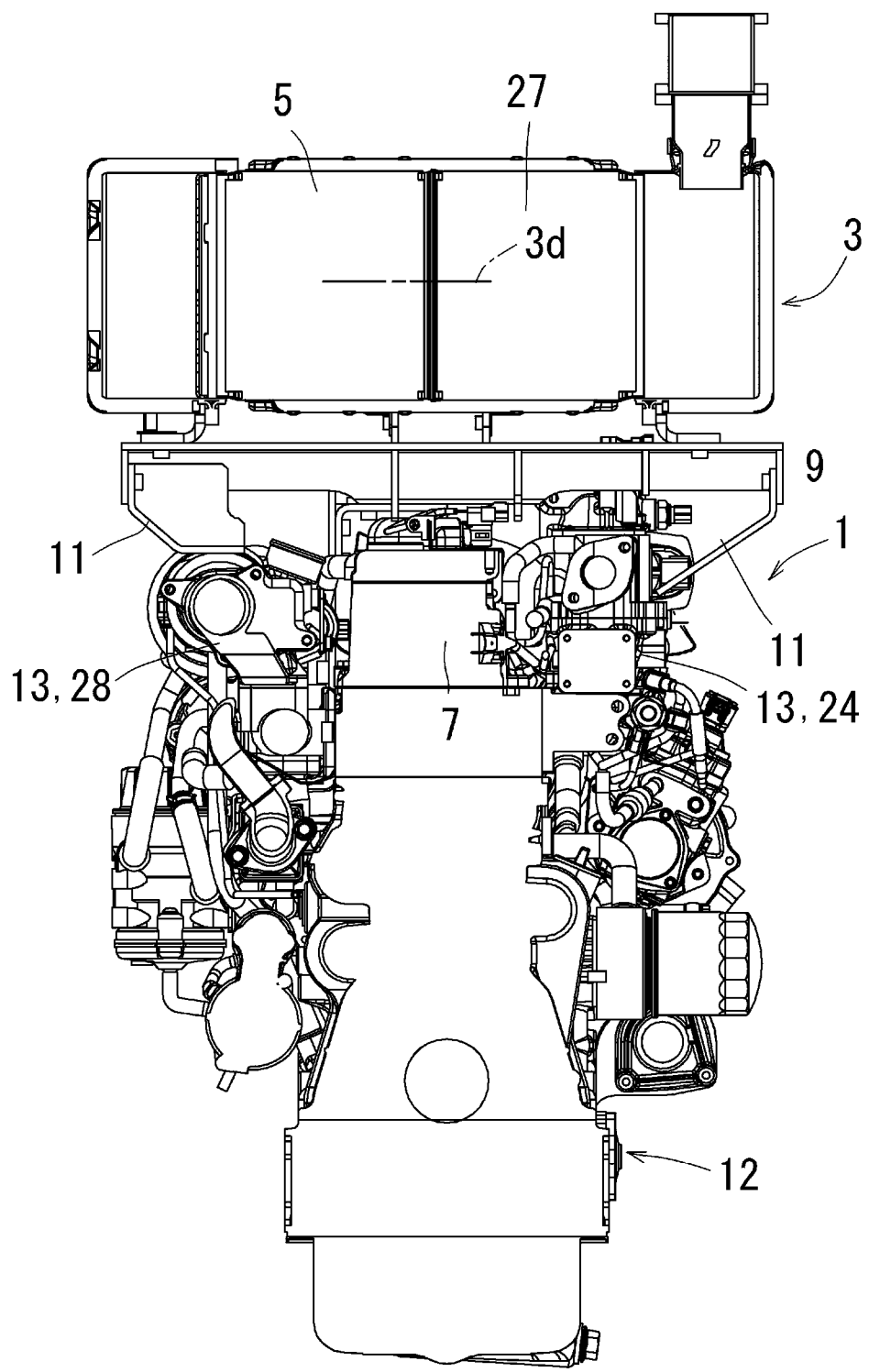
FIG. 6 is a sectional back view of the engine in FIG. 1 taken at a position of the SCR catalyst case.

As shown in FIG. 2, an intake manifold (24) is mounted to one side in the lateral direction of the cylinder head (20). As shown in FIG. 3, an exhaust manifold (25) is mounted to the other side in the lateral direction of the cylinder head (20).

As shown as the example in FIGS. 1 to 3, because the DOC case (2) and the SCR catalyst case (3) are mounted to the engine main body (1), the engine main body (1), the DOC case (2), and the SCR catalyst case (3) can be disposed compactly. If the engine main body (1) is mounted to a machine to be mounted with the engine, the DOC case (2) and the SCR catalyst case (3) are mounted at the same time to the machine to be mounted with the engine, which facilitates mounting to the machine to be mounted with the engine.

As shown in FIG. 2, the DOC case (2) is disposed at a position displaced diagonally backward and upward from the flywheel housing (6).

The DOC case (2) is disposed directly behind the cylinder head cover (7). In other words, as shown in FIG. 1, the DOC case (2) is disposed at the position overlapping a back face of the cylinder head cover (7) when seen in the direction parallel to the front-back direction in a back view.

As shown in FIG. 2, the SCR catalyst case (3) is disposed directly above the cylinder head cover (7). In other words, as shown in FIG. 7, the SCR catalyst case (3) is disposed at a position overlapping an upper face of the cylinder head cover (7) when seen in the direction parallel to the vertical direction in a plan view.

As shown in FIGS. 1 to 3, the engine main body (1) includes a DOC base bracket (8), an SCR base bracket (9), a DOC support base (10), and an SCR support stay (11).

Onto the DOC base bracket (8), the DOC case (2) is placed and mounted.

Onto the SCR base bracket (9), the SCR catalyst case (3) is placed and mounted.

The DOC support base (10) is provided to an upper portion of the flywheel housing (6), the flywheel housing (6) is a cast disposed at a back end portion of the cylinder block (12), the DOC support base (10) is formed by a protruding portion of the flywheel housing (6) by casting, and the DOC base bracket (8) is placed and mounted onto the DOC support base (10).

The flywheel housing (6) and a transmission case (not shown) connected to the flywheel housing (6) are used together as a main frame of a traveling machine body such as a tractor.

The SCR support stay (11) has an upper end portion fixed to the SCR base bracket (9) and a lower end portion fixed to an engine main body part (13) at a higher position than the cylinder block (12).

With this structure, the DOC case (2) can be firmly supported onto the engine main body (1) by the DOC support base (10) with high rigidity.

Moreover, because the SCR support stay (11) has the upper end portion fixed to the SCR base bracket (9) and the lower end portion fixed to the engine main body part (13) at the higher position than the cylinder block (12), a vertical length of the SCR support stay (11) can be reduced and the SCR catalyst case (3) can be firmly supported onto the engine main body (1) by the SCR support stay (11) with high rigidity.

The engine main body part (13) includes the intake manifold (24) shown in FIG. 2 and an exhaust flange pipe (28) shown in FIG. 3. The exhaust flange pipe (28) is a pipe connecting an exhaust turbine (29a) of a supercharger (29) mounted to an upper portion of the exhaust manifold (25) and an exhaust inlet pipe (2d) of the DOC case (2).

As shown in FIG. 7, the SCR base bracket (9) has a front extension portion (9a) led out forward and the front extension portion (9a) is supported on the intake manifold (24) and an engine lifting plate (31) with a front support stay (9b) interposed therebetween. In this way, forward and backward swing of the SCR base bracket (9) is suppressed.

As shown in FIG. 1, the SCR exhaust inlet pipe (14) has slip joint portions (17) at opposite end portions.

Figure 9:
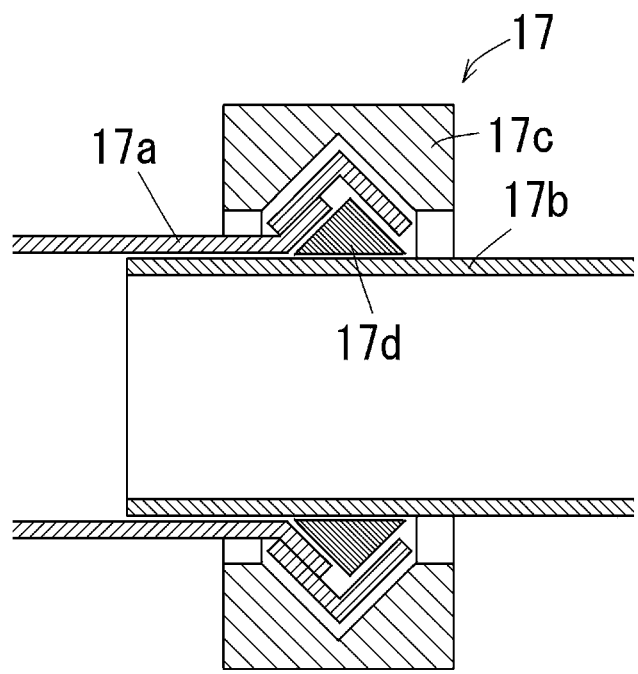
FIG. 9 is a diagram for explaining a principle of a slip joint portion used in the engine in FIG. 1.

As shown in FIG. 9, in principle, a slip joint portion (17) is formed so that pipe portions (17a), (17b) are fitted with each other to be able to slide for extension and contraction in a longitudinal direction and fixed at a predetermined sliding position of the extension and contraction by a fastening portion (17c).

The fastening portion (17c) is a fastening band and fixes the pipe portions (17a), (17b) by fastening. A clearance between the pipe portions (17a), (17b) is sealed with a gasket (17d).

With this structure, by temporarily loosening the fastening by the slip joint portions (17) after the DOC case (2) and the SCR catalyst case (3) are mounted to the engine main body (1), stress caused at each portion of piping and the like by torsion or displacement is released and distortion of each portion of the piping and the like can be prevented.

As shown in FIG. 4A, an exhaust outlet pipe (2a) of the DOC case (2) is led out in a radial direction from a peripheral wall on one end side of the DOC case (2).

If one of the opposite end sides of the SCR catalyst case (3) and on the same side as the exhaust outlet pipe (2a) of the DOC case (2) is defined as one end side and an opposite side is defined as the other end side, an exhaust inlet pipe (3a) of the SCR catalyst case (3) is led out from a peripheral wall on the other end side to curve toward the one end side.

The SCR exhaust inlet pipe (14) includes the curved pipe portion (14b) and the urea water mixing pipe portion (14a), the curved pipe portion (14b) is connected to an outlet end portion (2c) of the exhaust outlet pipe (2a) of the DOC case (2) and led out from the outlet end portion (2c) of the exhaust outlet pipe (2a) to curve toward the exhaust inlet pipe (3a) of the SCR catalyst case (3), the urea water mixing pipe portion (14a) is led out straight from an outlet end portion (14c) of the curved pipe portion (14b) toward the exhaust inlet pipe (3a) of the SCR catalyst case (3), and an outlet end portion (14d) of the urea water mixing pipe portion (14a) is connected to the exhaust inlet pipe (3a) of the SCR catalyst case (3).

Therefore, the exhaust (15) does not invert in the exhaust outlet pipe (2a) of the DOC case (2), the exhaust inlet pipe (3a) of the SCR catalyst case (3), and the SCR exhaust inlet pipe (14), which reduces passing resistance of the exhaust (15) from the DOC case (2) into the SCR catalyst case (3) to thereby suppress increase in back pressure.

Next, the second embodiment will be described.

The second embodiment is different from the first embodiment in the following respects.

Figure 10:
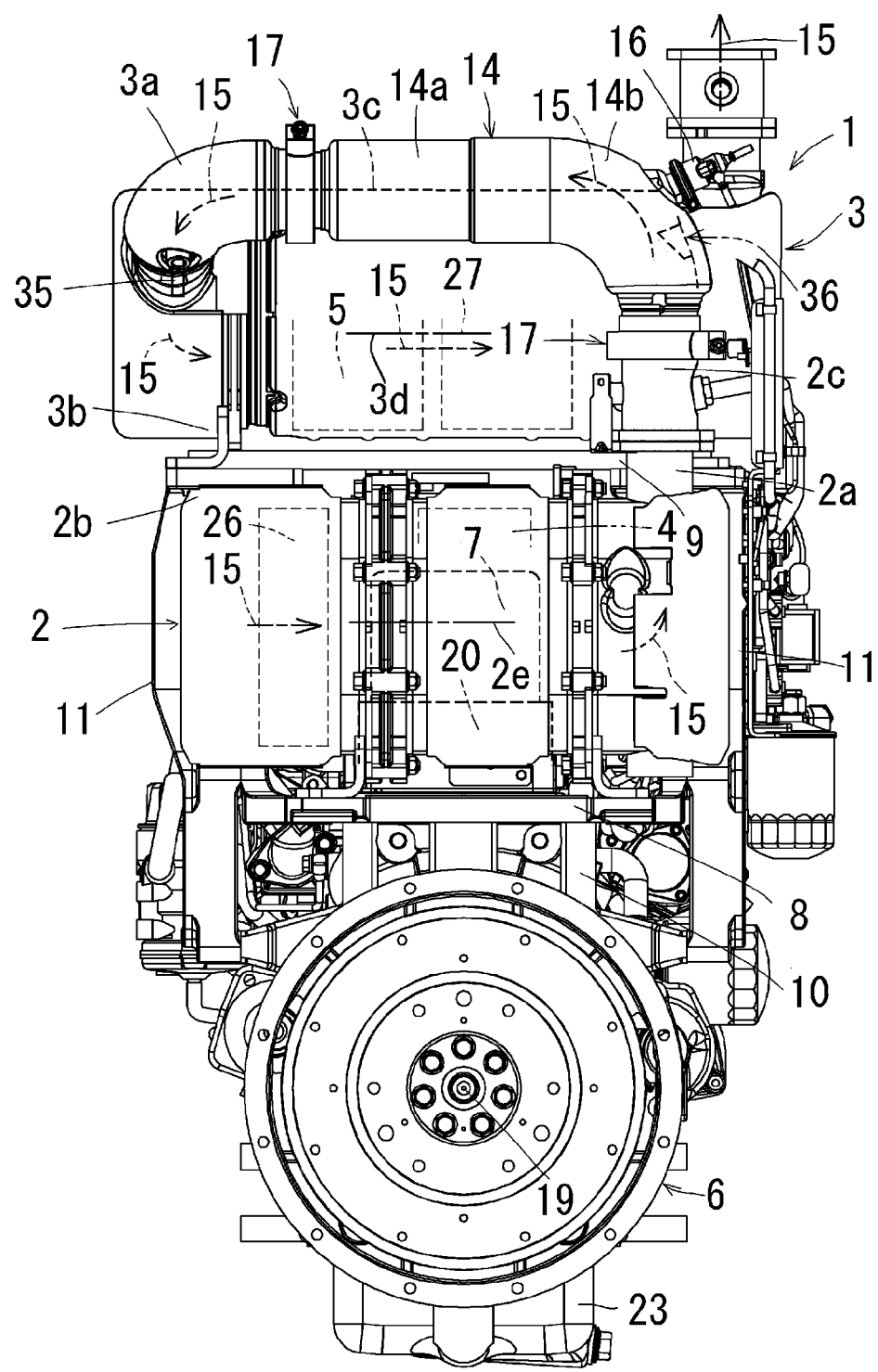
FIG. 10 is a back view of a diesel engine according to a second embodiment of the invention.
Figure 11:
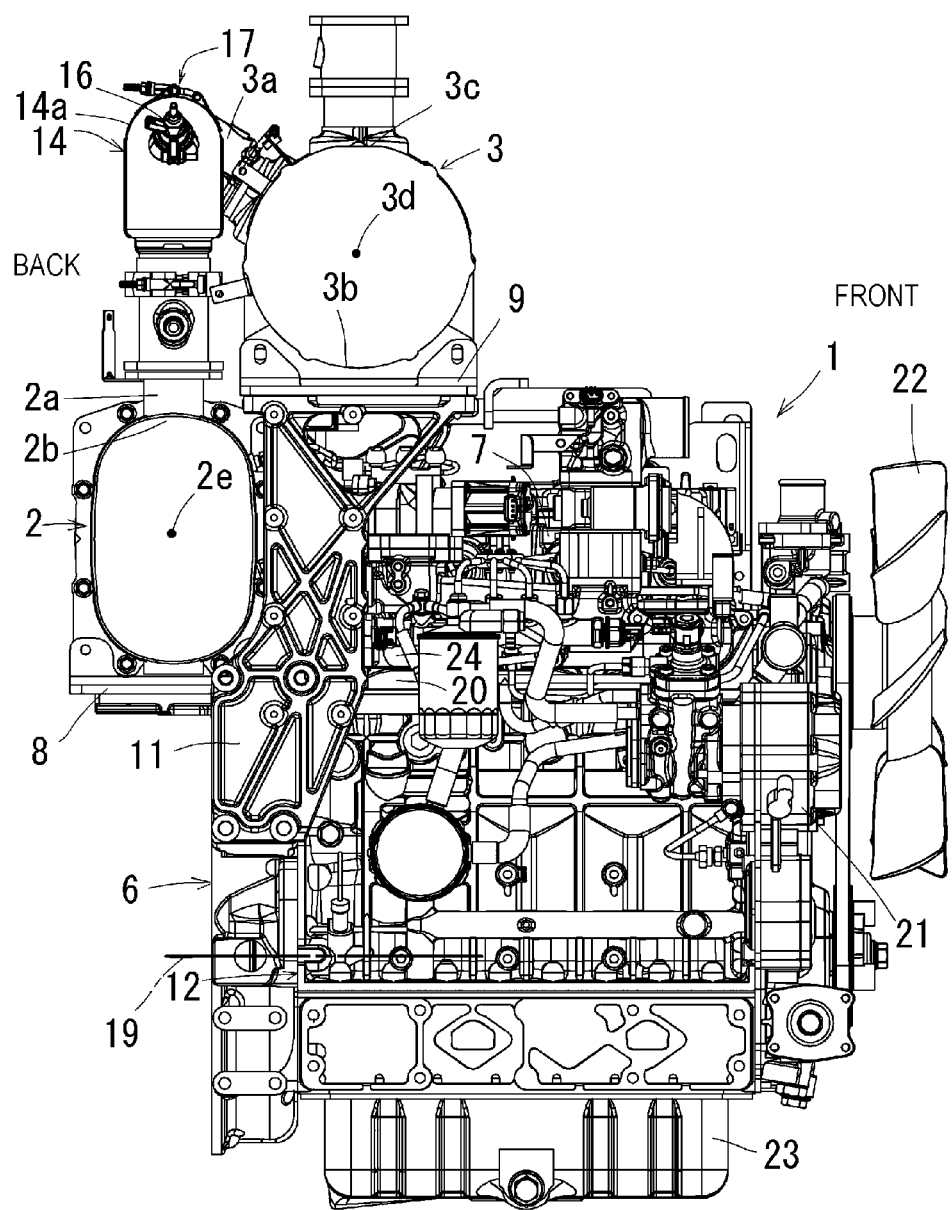
FIG. 11 is a right side view of the engine in FIG. 10.
Figure 12:
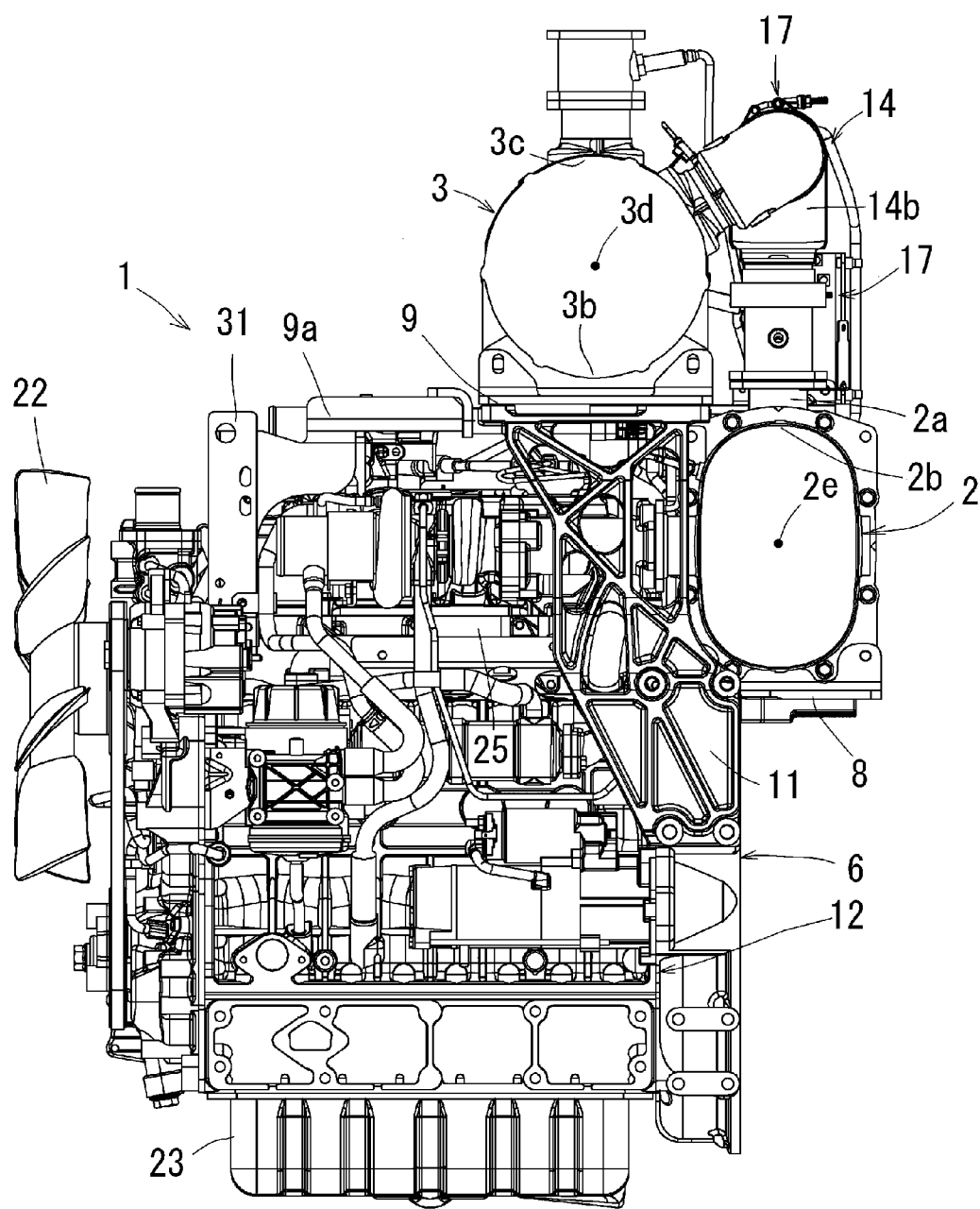
FIG. 12 is a left side view of the engine in FIG. 10.
Figure 14:
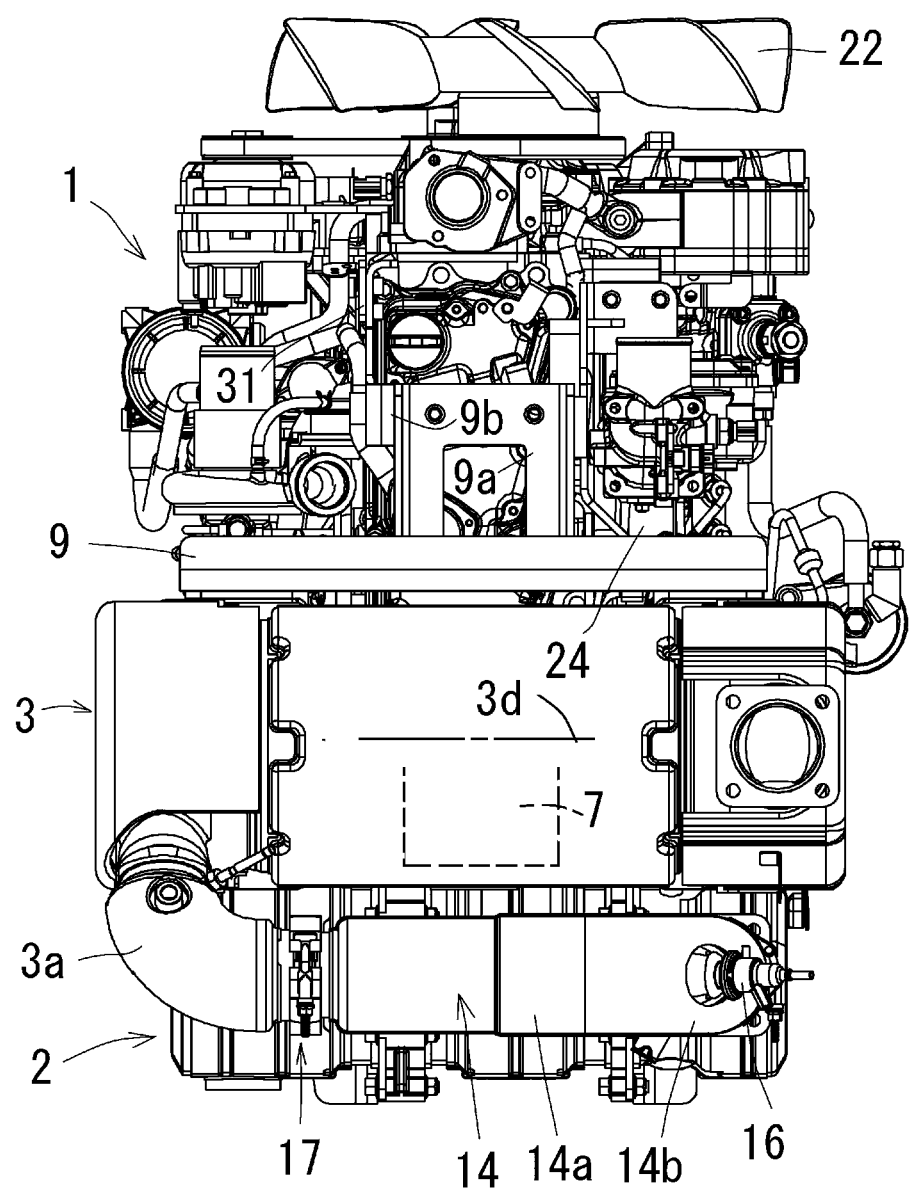
FIG. 14 is a plan view of the engine in FIG. 10.
Figure 15:
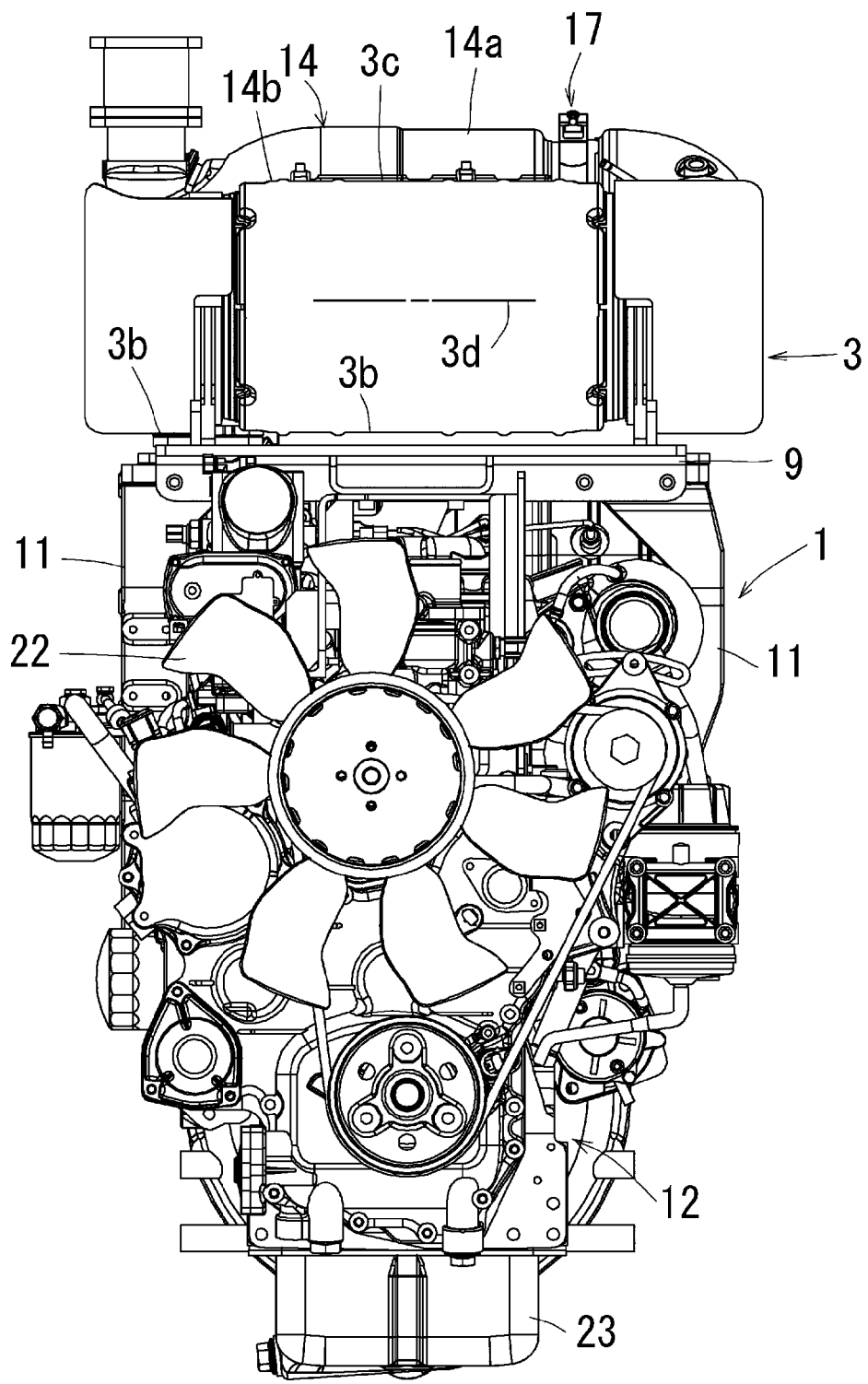
FIG. 15 is a front view of the engine in FIG. 10.

As shown in FIGS. 10 to 12, an engine main body (1) includes a DOC base bracket (8), an SCR base bracket (9), a DOC support base (10), and an SCR support stay (11).

Onto the DOC base bracket (8), a DOC case (2) is placed and mounted.

Onto the SCR base bracket (9), an SCR catalyst case (3) is placed and mounted.

The DOC support base (10) is provided to an upper portion of a flywheel housing (6), the flywheel housing (6) is a cast disposed at a back end portion of a cylinder block (12), the DOC support base (10) is formed by a protruding portion of the flywheel housing (6) by casting, and the DOC base bracket (8) is placed and mounted onto the DOC support base (10).

The SCR support stay (11) has a lower portion fixed to the flywheel housing (6) and the DOC base bracket (8) and the SCR base bracket (9) is fixed to an upper end portion of the SCR support stay (11).

In this way, the DOC case (2) can be firmly supported onto the engine main body (1) by the DOC support base (10) with high rigidity.

Moreover, because the SCR support stay (11) has a lower portion fixed to the flywheel housing (6) and the DOC base bracket (8) and the SCR base bracket (9) is fixed to the upper end portion of the SCR support stay (11), the SCR catalyst case (3) can be supported on the flywheel housing (6) with high rigidity by the SCR support stay (11) and also on the DOC support base (10) with high rigidity by the SCR support stay (11) and the DOC base bracket (8). Therefore, the DOC case (2) can be firmly supported onto the engine main body (1).

Figure 16:
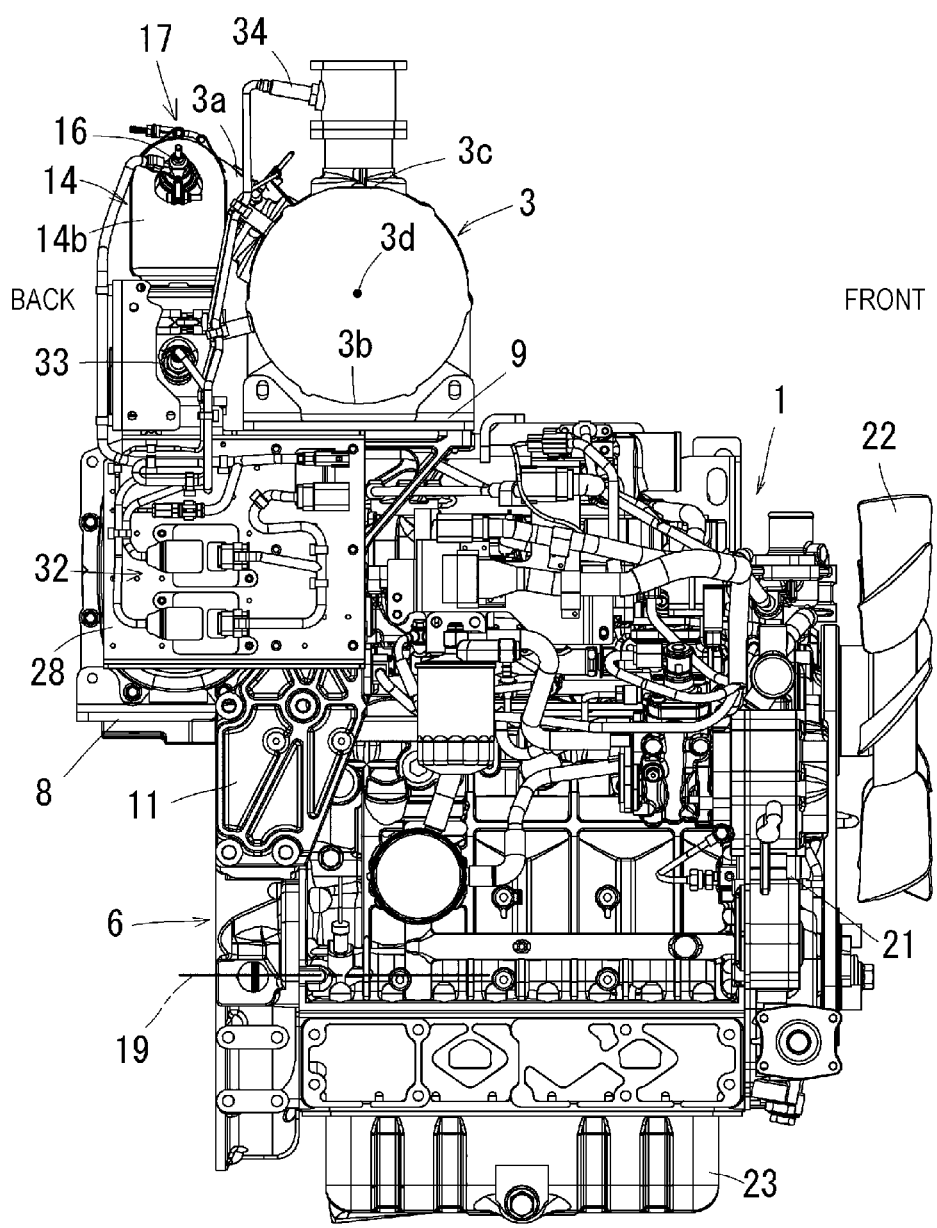
FIG. 16 is a right side view of a variation of the engine in FIG. 10.

In a variation of the second embodiment shown in FIG. 16, the following structure is added to the basic example of the second embodiment shown in FIGS. 10 to 15.

In other words, an engine has a connector mounting plate (28), the connector mounting plate (28) is mounted to an SCR support stay (11), and connectors (32) for electronic components are mounted to the connector mounting plate (28). Therefore, the connector mounting plate (28) is less likely to vibrate and damage to the connectors (32) due to vibrations can be suppressed.

What is claimed is:

1. An engine exhaust treatment device comprising:
    a selective catalytic reduction (SCR) catalyst case housing an SCR catalyst;
    an SCR exhaust inlet pipe; and
    a urea water injector having a nozzle portion directed toward an inside of the SCR exhaust inlet pipe,
    the SCR exhaust inlet pipe comprising:
        an inner peripheral face,
        an exhaust deflector mounted to the inner peripheral face on an exhaust upstream side from the urea water injector,
        the exhaust deflector having an exhaust deflecting face extending from the inner peripheral face toward a downstream side of the exhaust deflecting face, the exhaust deflecting face gradually separating from the inner peripheral face as the exhaust deflecting face extends from an exhaust upstream side toward an exhaust downstream side, such that inversion of exhaust back toward the upstream side is suppressed, thereby lowering exhaust back pressure and exhaust flowing toward the nozzle portion of the urea water injector is deflected by the exhaust deflector and diverted from the nozzle portion.

2. The engine exhaust treatment device according to claim 1, wherein the exhaust deflector includes an exhaust deflecting plate separated from the inner peripheral face of the SCR exhaust inlet pipe, one of front and back faces of the exhaust deflecting plate not facing the inner peripheral face of the SCR exhaust inlet pipe being formed as the exhaust deflecting face and the other of the front and back faces of the exhaust deflecting plate facing the inner peripheral face of the SCR exhaust inlet pipe being formed as a non-deflecting face, and an exhaust passing clearance being provided between the non-deflecting face and the inner peripheral face of the SCR exhaust inlet pipe.

3. The engine exhaust treatment device according to claim 2, wherein the exhaust passing clearance is formed so that an opening area of a start opening portion on the exhaust upstream side is smaller than an opening area of an end opening portion on the exhaust downstream side.

4. The engine exhaust treatment device according to claim 3, further comprising a diesel oxidation catalyst (DOC) case housing a DOC, the DOC case having a central axis defining a longitudinal direction, wherein the SCR catalyst case is oriented in a direction parallel to the longitudinal direction of the central axis of the DOC case, the SCR catalyst case being positioned diagonally forward and upward from the DOC case, if a horizontal direction is a front-back direction with one side of the front-back direction being a front side and the other side being a back side from a view parallel to the longitudinal direction of the central axis of the DOC case, and the SCR exhaust inlet pipe includes a urea water mixing pipe portion where the exhaust led out from the DOC case and urea water injected from the nozzle portion of the urea water injector are mixed, the urea water mixing pipe portion being formed straight and oriented in a direction parallel to the longitudinal direction of the central axis of the DOC case and a central axis of the SCR catalyst case, and the urea water mixing pipe portion being positioned behind the SCR catalyst case and above the DOC case.

5. The engine exhaust treatment device according to claim 4, wherein a highest portion of a peripheral face of the DOC case is disposed at a lower position than a lowest portion of a peripheral face of the SCR catalyst case and the urea water mixing pipe portion is disposed at a position overlapping a highest portion of the peripheral face of the SCR catalyst case from a view parallel to the front-back direction.

6. The engine exhaust treatment device according to claim 2, further comprising a diesel oxidation catalyst (DOC) case housing a DOC, the DOC case having a central axis defining a longitudinal direction, wherein the SCR catalyst case is oriented in a direction parallel to the longitudinal direction of the central axis of the DOC case, the SCR catalyst case being positioned diagonally forward and upward from the DOC case, if a horizontal direction is a front-back direction with one side of the front-back direction being a front side and the other side being a back side from a view parallel to the longitudinal direction of the central axis of the DOC case, and the SCR exhaust inlet pipe includes a urea water mixing pipe portion where the exhaust led out from the DOC case and urea water injected from the nozzle portion of the urea water injector are mixed, the urea water mixing pipe portion being formed straight and oriented in a direction parallel to the longitudinal direction of the central axis of the DOC case and a central axis of the SCR catalyst case, and the urea water mixing pipe portion being positioned behind the SCR catalyst case and above the DOC case.

7. The engine exhaust treatment device according to claim 6, wherein a highest portion of a peripheral face of the DOC case is disposed at a lower position than a lowest portion of a peripheral face of the SCR catalyst case and the urea water mixing pipe portion is disposed at a position overlapping a highest portion of the peripheral face of the SCR catalyst case from a view parallel to the front-back direction.

8. The engine exhaust treatment device according to claim 1, further comprising a diesel oxidation catalyst (DOC) case housing a DOC, the DOC case having a central axis defining a longitudinal direction, wherein the SCR catalyst case is oriented in a direction parallel to the longitudinal direction of the central axis of the DOC case, the SCR catalyst case being positioned diagonally forward and upward from the DOC case, if a horizontal direction is a front-back direction with one side of the front-back direction being a front side and the other side being a back side from a view parallel to the longitudinal direction of the central axis of the DOC case, and the SCR exhaust inlet pipe includes a urea water mixing pipe portion where the exhaust led out from the DOC case and urea water injected from the nozzle portion of the urea water injector are mixed, the urea water mixing pipe portion being formed straight and oriented in a direction parallel to the longitudinal direction of the central axis of the DOC case and a central axis of the SCR catalyst case, and the urea water mixing pipe portion being positioned behind the SCR catalyst case and above the DOC case.

9. The engine exhaust treatment device according to claim 8, wherein a highest portion of a peripheral face of the DOC case is disposed at a lower position than a lowest portion of a peripheral face of the SCR catalyst case and the urea water mixing pipe portion is disposed at a position overlapping a highest portion of the peripheral face of the SCR catalyst case from a view parallel to the front-back direction.

10. The engine exhaust treatment device according to claim 1, wherein the exhaust deflecting face is formed as a flat surface.

* * * * *